United States Patent
Christie, II

(10) Patent No.: US 9,568,950 B2
(45) Date of Patent: Feb. 14, 2017

(54) ON-WALL DOCKING STATION FOR TOUCH-PANEL DEVICES

(71) Applicant: INTUITIVE, LLC, Phoenix, AZ (US)

(72) Inventor: Cary Lee Christie, II, Phoenix, AZ (US)

(73) Assignee: INTUITIVE, LLC, Phoenix, AZ (US)

( * ) Notice: Subject to any disclaimer, the term of this patent is extended or adjusted under 35 U.S.C. 154(b) by 0 days.

(21) Appl. No.: 15/047,425

(22) Filed: Feb. 18, 2016

(65) Prior Publication Data

US 2016/0246328 A1 Aug. 25, 2016

Related U.S. Application Data

(60) Provisional application No. 62/118,050, filed on Feb. 19, 2015.

(51) Int. Cl.
| | |
|---|---|
| G06F 1/16 | (2006.01) |
| F16M 13/02 | (2006.01) |
| F16M 11/04 | (2006.01) |
| F16M 11/10 | (2006.01) |
| F16B 1/00 | (2006.01) |

(52) U.S. Cl.
CPC .......... *G06F 1/1632* (2013.01); *F16M 11/041* (2013.01); *F16M 11/105* (2013.01); *F16M 13/02* (2013.01); *F16B 2001/0035* (2013.01)

(58) Field of Classification Search
CPC ......... G06F 1/16; G06F 1/1632; G06F 1/1633
See application file for complete search history.

(56) References Cited

U.S. PATENT DOCUMENTS

| | | | | |
|---|---|---|---|---|
| 2012/0194998 A1* | 8/2012 | McClure | ................ | H01Q 1/243 361/679.56 |
| 2012/0287563 A1* | 11/2012 | Onodera | ............... | G06F 1/1632 361/679.01 |
| 2013/0344917 A1* | 12/2013 | Sobti | .................. | H04M 1/0254 455/557 |

* cited by examiner

*Primary Examiner* — Anthony Q Edwards
(74) *Attorney, Agent, or Firm* — B. Anna McCoy

(57) ABSTRACT

The present disclosure relates to systems for mounting touch-panel devices such as smartphones or tablets. An example embodiment of an on-wall docking station is provided wherein the docking station comprises a metallic pad, a gripping surface, mounting screws, a mounting plate, an external connection port, magnets, a near field communication device, and a magnet buffer. The docking station may allow for mounting a touch-panel device in a plurality of mounting orientations.

20 Claims, 10 Drawing Sheets

ON-WALL DOCKING STATION FOR TOUCH-PANEL DEVICES

CROSS-REFERENCE TO RELATED APPLICATIONS

The present application claims priority to U.S. Patent Application No. 62/118,050, entitled "AN ON-WALL DOCKING STATION/MOUNT FOR TABLETS, PHONES, TOUCH-PANELS OR SIMILAR DEVICES," filed on Feb. 19, 2015, the entire contents of which are hereby incorporated by reference for all purposes.

FIELD

The present disclosure relates generally to a device to easily mount touch-panel devices such as phones, tablets, and similar devices to a wall, mirror, or any surface with the use of magnets and a metallic pad.

BACKGROUND/SUMMARY

Touch-panel devices, also referred to herein as touch-panel display devices, such as tablets, are used widely for a plurality of various applications in the home and office. For example, tablets may be used for reading electronic versions of books, controlling home automation, cameras, playing music, etc. So far, there are only a limited number of wall mount options on the market that are available to consumers. The available options for wall mounting touch-panel devices include mounts specific to one model or brand of touch-panel device which may force a consumer to change the mount along with upgrading or replacing the touch-panel device. Some additional mounting devices may require cutting into a wall or other mounting surface in order to effectively couple the mount to the mounting surface.

However, the inventors herein have recognized potential issues with such systems. As one example, other methods of mounting touch-panel display devices may include bulky cases or large external attachments to be placed onto the exterior of a touch-panel device. Mounting devices that require attachments to be placed onto the touch-panel display device may typically inhibit the use of an existing protective case. Further, mounting devices that require a touch-panel device to be contained within a specific case may therefore limit the options for protective cases.

As one example, the present disclosure provides a touch-panel mounting system comprising durable, easily mounted pieces that are substantially free of peripheral projections. The mounting assembly may further comprise a substantially thin profile that may be configured to mount any touch-panel device.

In one exemplary embodiment of the present disclosure, a mounting solution which is easy to use, comprises a substantially thin profile, is strong, durable, and includes the ability to mount directly to walls, mirrors, granite, or any other surface is provided. Additionally, the docking station may provide reliable mounting of touch-panel devices such as tablets, while maintaining the ability to use an existing protective or carrying case.

In another embodiment, a near field device tag may be added to the mounting assembly. In this way, the tablet or other near field capable touch-panel device may be able to determine its location relative to the mounting device which may further allow the touch-panel device to automatically trigger specific applications for example.

It will be appreciated that the touch-panel device mounting system as described herein may be configured such that the mounting system may be used with any brand or model of a touch-panel device. Further, multiple touch-panel devices, including devices of different brands or models may be used on the same mount. In this way, a singular mounting device may be used for a plurality of different touch-panel devices. As an example, a household may use the same mounting device to mount devices belonging to the whole family as well as guests.

One embodiment of the present disclosure provides that the mounting device comprises and is constructed from one or more pieces such that the mount is easy to install, and flexible in its mounting location. Further, the mounting system may comprise one or more of plastics, metals, rubbers, screws, wires, and magnets in at least one example.

The summary provided herein is intended to introduce a selection of concepts in simplified form that are further described below in the detailed description. It is not meant to identify key or essential features of the claimed subject matter, the scope of which is defined uniquely by the claims that follow the detailed description. Furthermore, this summary is not intended to be used to limit the scope of the claimed subject matter. Furthermore, the claimed subject matter is not limited to implementations that solve any or all disadvantages noted in any part of this disclosure.

DETAILED DESCRIPTION

Figure 1:
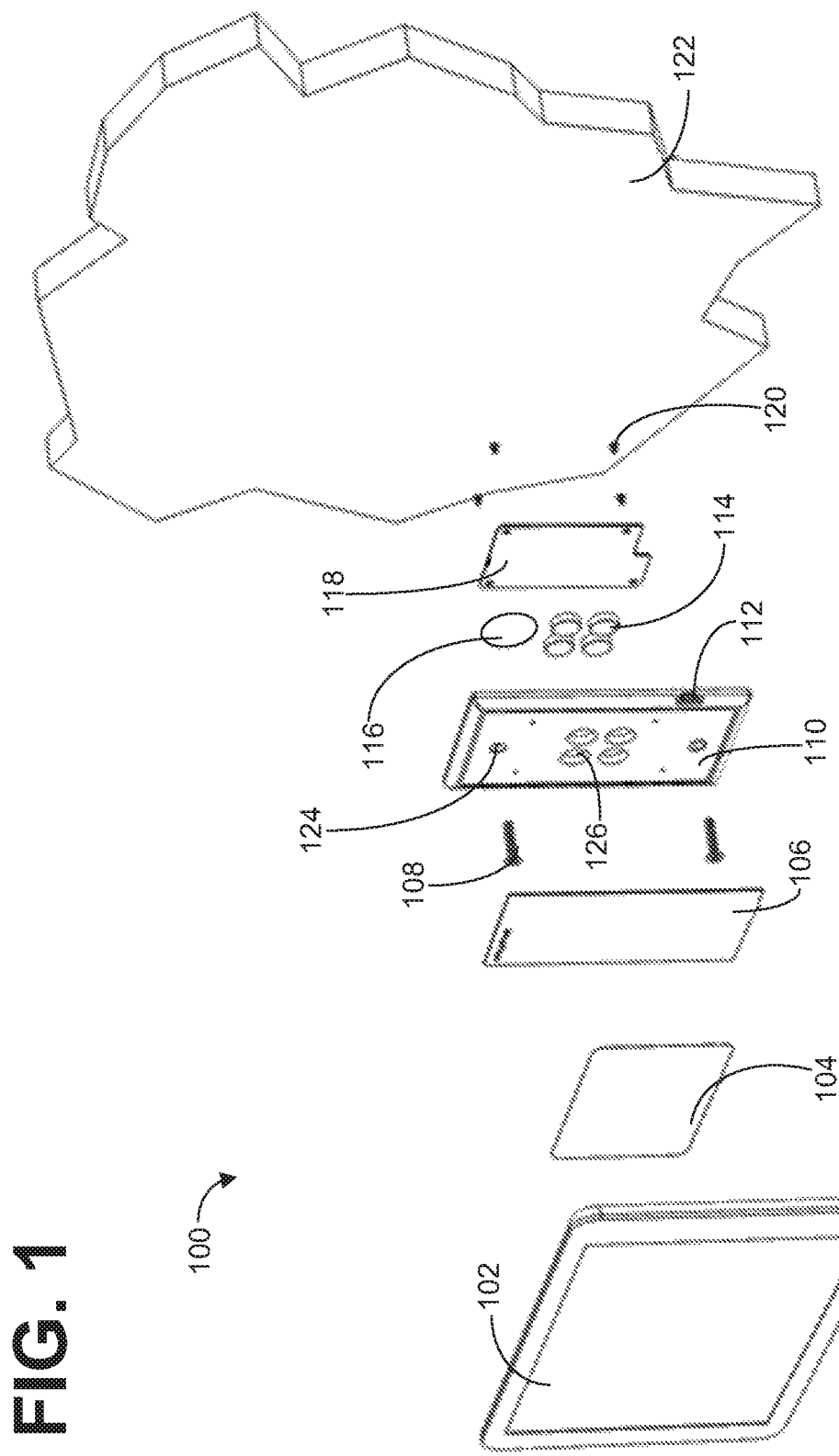
FIG. 1 shows a partially exploded view of a touch-panel mounting system.

The present description relates to an on-wall docking station 100 also referred to herein as a mount, mounting system, or mounting device, that may be used with touch-panel devices such as tablets, phones, or other such similar devices. The docking station 100 may be used to mount touch-panel display devices to any wall, mirror, or other such surface via the use of magnet and a magnetically retained metallic pad.

In one embodiment, the docking station may comprise a mount assembly and a metallic pad. The mount assembly may be attached to the mounting surface using a securing method such as screws and anchors for surfaces that may be relatively easy to mount onto such as drywall. The mount assembly may further be fixedly attached to more complex wall surfaces such as to electrical boxes or trim rings such that additional cutting into the wall may not be necessary. In some embodiments, the docking station may be mounted to smooth and/or delicate surfaces that a user may not want to drill into such as a mirror or a granite surface for example. In such cases, a durable adhesive such as a double-sided tape may be used to affix the mount to the selected mounting surface. Additionally, a suction cup or other suitable suction adhesion device may be used to affix the mount to a selected surface.

As an example, the adhesive tape provided to attach the docking station assembly 100 to a mounting surface 122 may comprise 3M VHB tape or any other suitable high-strength bonding tape.

As one example embodiment, the mount may rely on magnets disposed within the interior region of the mounting plate of the mount assembly to magnetically couple to the device selected to mount via a metallic pad. In some embodiments, the mounting plate may be constructed of a magnetic material such that the entire plate may serve to magnetically retain the metallic pad.

The metallic pad may be removably attached to a rear external face of a touch-panel display device or case. It will be appreciated that in at least one embodiment, the metallic pad may be applied to any suitable surface such as the back of a tablet or a protective case, for example. Further, the metallic pad may be oriented in a plurality of various orientations so long as the metallic pad is in direct face-sharing contact with a gripping surface on an external front face of the mounting plate.

The metallic pad may be attached to a rear external face of a touch-panel display device via a double-sided tape or other suitable adhesive such that the pad may be removed or repositioned. In one embodiment, the metallic pad may be attached to the rear face of a touch-panel display device via, double-sided adhesive that may be substantially thin. In this way, it may be possible for a user of the touch-panel display device to use the device's existing protective case for example.

Once the metallic pad is attached to the external face of the touch-panel display device and the mount has been fixedly attached to a suitable surface, the mount may then magnetically retain the touch-panel device via the metallic pad. In order to attach the touch-panel device to the mount, a user may simply place the device onto the front external face of the mount and release the device. The magnetic attractive forces of the magnets disposed within the interior of the mount assembly may substantially secure the touch-panel device by way of the magnetic plate affixed to the touch-panel device's exterior rear face. In order to remove the device from the mount assembly, a user may simply grip the touch-panel display device and pull away from the mount assembly. In this way, a mounting device may be provided that allows for simple placement and removal without requiring excessive modification to the device to be mounted/displayed.

As one example embodiment, the magnets disposed within an internal region of a mounting plate may be oriented to provide a sufficient magnetic field. In one example, the magnets may be positioned with an alternating polarity. For example, in an embodiment comprising four magnets, the magnets may be arranged in a square formation wherein the top magnets have opposing polarities. The bottom magnets may then be oriented opposite the top magnets. Specifically, a top left magnet may exhibit a negative polarity and a top right magnet may exhibit a positive polarity while a bottom left magnet may exhibit a positive polarity and a bottom right magnet may exhibit a negative polarity. In this way, the magnets may combine to create a relatively stronger magnetic field. In other examples, other alternating patterns of polarity may be applied. Further, in some examples, magnets exhibiting a similar or common polarity may be regionally disposed.

In embodiments comprising a metallic or metal pad, the pad may be magnetically retained in a secure fashion such that the metallic pad may be oriented in a variety of orientations referred to herein as a first position, second position, and third position.

As used herein, a first position may refer to the metallic pad positioned in a vertical orientation. A second position may refer to the metallic pad positioned in a horizontal orientation. A third position of the metallic pad may refer to a variety of position orientations between vertical and horizontal relative to the plane of the mounting surface. In other words, a third position may be any position between the first and second positions. It will be appreciated that the polarity orientation and the combined magnetic field of the magnets may enhance the magnetic field and allow for retention of the metallic pad in a plurality of orientations.

In some embodiments of the mounting assembly, there may be an option to charge the mounted device while in place via hard wired charging methods via a micro connector or wire such as a micro USB port or other suitable wired connections. In additional example embodiments, a form of inductive wireless charging such as QI or other wireless charging methods such as PMA may be implemented.

A further example embodiment may feature a sensor that may provide feedback to the touch-panel device. For example, in one embodiment, the sensor may allow for the location of the mount to be known via near field communication techniques. In this way, when the touch-panel device is in a specific location such as near the mount, the touch-panel device may perform specific selected tasks automatically. For example, when a user places the mount assembly in a kitchen setting, the touch-panel device may automatically open a cookbook application. In this way, communication between the touch-panel device and the mount assembly may provide the user with an enhanced user experience.

Further, some embodiments of the on-wall docking station may blend cosmetically with other features or components of a wall or other mounting surface such as light switches, or power plates for example. In such cases, the mount assembly may be of similar size or comprise a similar shape as power plates or light switches of a home or office setting. In this way, the on-wall docking station and mount assembly may provide a surface that does not detract from the overall aesthetics of a wall or other mounting surface when the mount assembly is not in use.

As one example embodiment, a near field communication device tag may be included within the mount assembly which may allow the mount to automatically trigger or initiate applications stored on the touch-panel device.

Turning now to FIG. 1, this figure shows an example touch-panel display device 102 such as a smartphone, tablet, or other such touch-panel display device and an exploded view of the disclosed mount assembly 100. It will be appreciated that the mount assembly may also be referred to herein as a docking station or more simply as a dock or mount.

The mount assembly 100 may, in some embodiments, utilize magnetic attractive forces to secure the touch-panel device 102 via the use of magnets 114 and a metallic pad 104. The metallic pad 104 may be removably attached to a rear exterior face of the touch-panel device 102. The metallic pad may further be fully rotatable when physically coupled to the mount assembly. For example, when coupled to the mount assembly 100, the metallic pad may be rotated and may rest in any desired orientation so long as the mount assembly 100 and the metallic pad 104 are in direct face-sharing contact.

The mount assembly 100 may comprise a gripping surface 106 such as a traction pad, mounting screws 108, a mounting plate 110 which may further include an external connector 112, a plurality of magnets 114, a near field communication device 116, a magnet buffer 118, and rearward screws 120. The mount assembly 100 may be secured to a mounting surface 122 such as a wall or other suitable planar surface.

The external connector 112, also referred to herein as the external connection or external connection port may be disposed along a side edge of the mount assembly 100. The external connection port may be configured to accept a wired input such as a USB input in one example. The external connector 112 may further comprise a mini USB, micro USB or other suitable port capable of providing data and power transmission in at least one example.

In one embodiment, the mount assembly 100 may comprise a substantially thin profile in line with the mounting surface 122 along the same plane. In another embodiment, the mount assembly 100 may be substantially flush with the mounting surface 122. In this way, the mount assembly 100 may be minimally visible. Further, the metallic pad 104 may be freely rotatable when coupled to the mount assembly 100 such that the touch-panel device may be displayed in a plurality of various orientations.

The magnetic pad 104 may be removably attached to a rearward external face of the touch-panel device 102 using a double-sided tape in one example embodiment. In this way, a magnetic metallic surface may be formed on the exterior of the touch-panel device 102 such that the magnets 114 disposed within the interior of the mount assembly 100 may attract and secure the touch-panel device in place.

A gripping surface 106 may additionally be provided in at least one embodiment such that the touch-panel device displayed may resist slipping. The gripping surface 106 may comprise a rubber, foam, or other suitable gripping surface that may grip metal, plastic, or glass surfaces. In this way, the mounted device may be held securely in place with a reduced possibility of slippage. Further, the gripping surface 106 may additionally raise or elevate the metallic pad away from the face of the mounting plate 110 to further protect the device and the mount from scratches or scrapes resultant from prolonged usage or wear.

In some embodiments, mounting screws 108 may be used to mount the entire docking station assembly 100 to a mounting surface 122. It will be appreciated that the mounting screws 108 may be used to mount the device onto wall board inserts, directly into the stud material, or into an existing electrical box. On surfaces which drilling may not be an option, such as in the case of a mirror or granite surface, a double-sided tape or other adhesive substrate may be used to adhere and couple the mount assembly 100 to the mounting surface 122. For example, in an embodiment mounted to a vertical mirror, a thin double-sided tape may be affixed to the rear face of the magnet buffer 118 and attached to the mirror.

The assembly's 100 mounting plate 110 may comprise at least one screw hole 124 through which mounting screws 108 may be placed in order to secure the assembly 100 to a mounting surface 122. One embodiment may additionally comprise a plurality of magnet voids 126 for receiving magnets.

The magnet voids 126 of the mount assembly 100 may comprise a substantially circular shape and may form a cavity into which magnets 114 may be disposed. It will be appreciated that the magnet voids 126 of the present disclosure may comprise a plurality of various shapes and sizes such that the magnet voids 126 match the shape of the magnets 114 to be used within the assembly 100. Additionally, the size, shape, strength and material from which the magnets may be constructed may be variable and may be configured to suit any number of applications such that the overall function and appearance of the mount assembly 100 is not impaired.

The mounting plate 110 is shown in the figures comprising an external connection port 112. The external connection may comprise a micro USB or other connector configured to facilitate power and/or data transfer. The external connection 112 may be located on a side external face of the mounting plate 110. The placement of the connection port 112 may provide easy access to the port by a user and may further provide the ability to change charging cable types. In this way, the assembly 100 may allow a user to change the cable type that may be compatible with the touch-panel device intended to be displayed.

In one embodiment, the mounting plate 110 may be constructed from a durable plastic material, the metallic pad and magnet buffer may be constructed from any magnetically responsive metal, and the gripping surface may be constructed from any suitable rubber or foam compound. In one embodiment, the magnet buffer may be configured to increase the magnetic field strength of the magnets disposed within the interior of the mounting plate.

Further, the magnets in one embodiment of the on-wall docking station assembly 100 may comprise neodymium iron boron magnets, samarium cobalt magnets, ceramic magnets or any other suitable magnet that may provide substantial magnetic attraction between the magnets disposed within the mount assembly 100 and the metallic pad 104.

In one embodiment, the magnets 114 disposed within the mount assembly 100 may further be disposed on a plane between an external mounting plate face and the magnet buffer 118 of the mount assembly 100. In this way, the magnets may not protrude excessively from the mounting plate 110. In another embodiment, a near field communication device 116 may be disposed on a plane common to the magnets 114 of the assembly and may further be sandwiched between a magnet buffer 118 and the mounting plate 110. The near field communication device, as briefly noted above, may allow for selected programming actions to be carried out on the touch-panel device 102 displayed.

Some embodiments of the on-wall docking station may include a magnet buffer 118 as shown in FIG. 1. The magnet buffer 118 may serve to increase the magnetic field supplied by the magnets 114 of the mount assembly 100. An increased magnetic field may provide stronger attraction of the magnets 114 to the metallic pad 104 attached to the touch-panel device 102. In one embodiment, the magnet buffer 118 may also serve to provide additional support for the magnets 114 and may keep them in place.

As shown in FIG. 1, rearward screws 120 may be provided in one embodiment in order to hold the magnet buffer 118 in place. It will be appreciated that in other embodiments, rearward screws 120 may not be necessary and may be substituted for other attachment mechanisms or techniques such as meltable plastic posts, snaps, or barbs for example.

Figure 2:
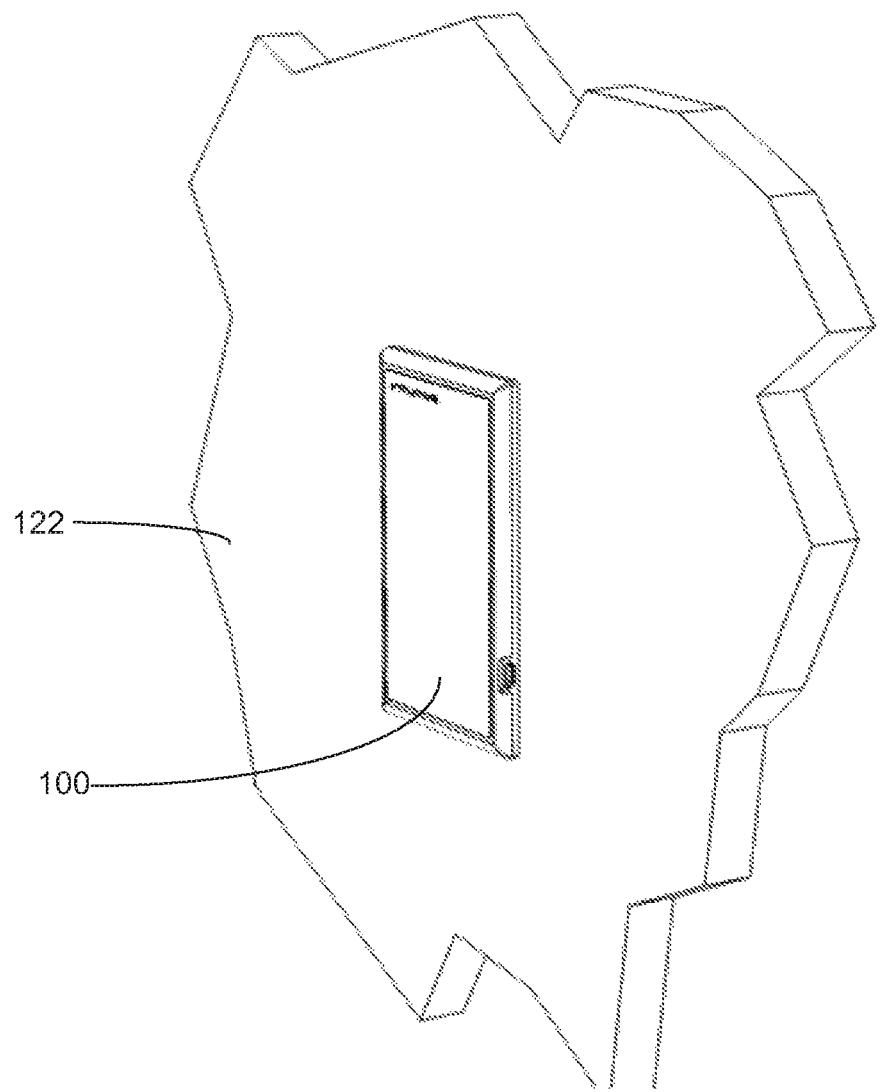
FIG. 2 shows a touch-panel mounting system affixed to a wall.

With respect to FIG. 2, this figure provides an illustrative example of how the docking station assembly 100 may appear when mounted to a mounting surface 122. The figure serves to provide an example of a typical finished installation of the assembly 100. When viewed in a quick glance, the assembly may appear to resemble a normal wall plate which may easily blend in with a room's décor.

When the docking station assembly 100 is affixed to a suitable mounting surface 122, a rear face of the assembly 100 may be in direct face-sharing contact with the mounting surface 122 such that there is no substantial gap between a mounting surface 122 and the docking station assembly 100.

Figure 3:
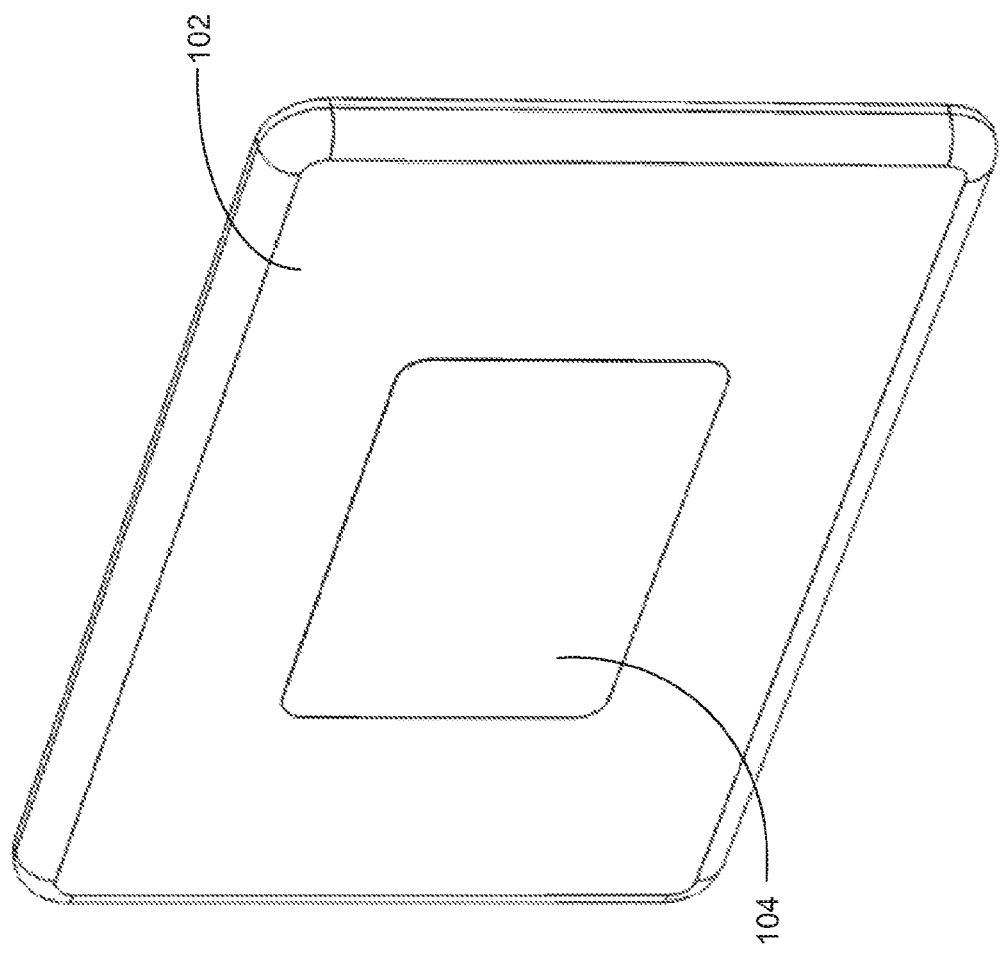
FIG. 3 shows a metallic pad attached to the rear of a touch-panel device.

Turning now to FIG. 3, this illustration provides a rear isometric view of a touch-panel display device such as a tablet 102. In order for the tablet 102 to be secured to the mount assembly 100, a metallic pad 104 may be removably affixed to a rear external face of the touch-panel device.

In one embodiment, the metallic pad 104 may be attached to the touch-panel display device 102 using a durable double-sided tape. In this way, a magnetic metallic surface for the magnets disposed within the mount assembly 100 to attach to, which may result in the touch-panel display device to be held securely in place.

It will be appreciated that any suitable alternative adhesion methods such as the use of a non-damaging adhesive may be configured to be used in combination with the metallic pad 104 in order to magnetically retain the touch-panel device 102 onto an exterior face of the mount assembly 100.

The metallic pad 104 may comprise a minimally edged surface which may further comprise rounded corners such that there are no sharp edges that may get caught on clothing or other fabrics for example. Additionally, the metallic pad 104 may comprise a substantially rectangular shape in one embodiment. It will be appreciated that the shape of the metallic pad may further be variable and may be configured to match the shape of the device to be displayed in at least one embodiment.

It will be appreciated that the use of a metallic pad, also referred to herein as magnetic pad 104, may allow for the mounting of a touch-panel display device 102 in any number of orientations from vertical to horizontal and inclusive of all orientations between. In this way, the touch-panel display device may be mounted or displayed in any direction so long as the metallic pad 104 is in magnetic communication with the magnets disposed within the mounting plate.

Additionally, the metallic pad 104 may be substantially thin such that the pad does not interfere with or hinder the use or applicability of a protective case. For example, the metallic pad 104 may be used in combination with an existing protective cover due to the substantially thin profile of the pad 104. In this way, a user may not be required to purchase an additional case or configure an existing case to work with the mount assembly 100.

Figure 4:
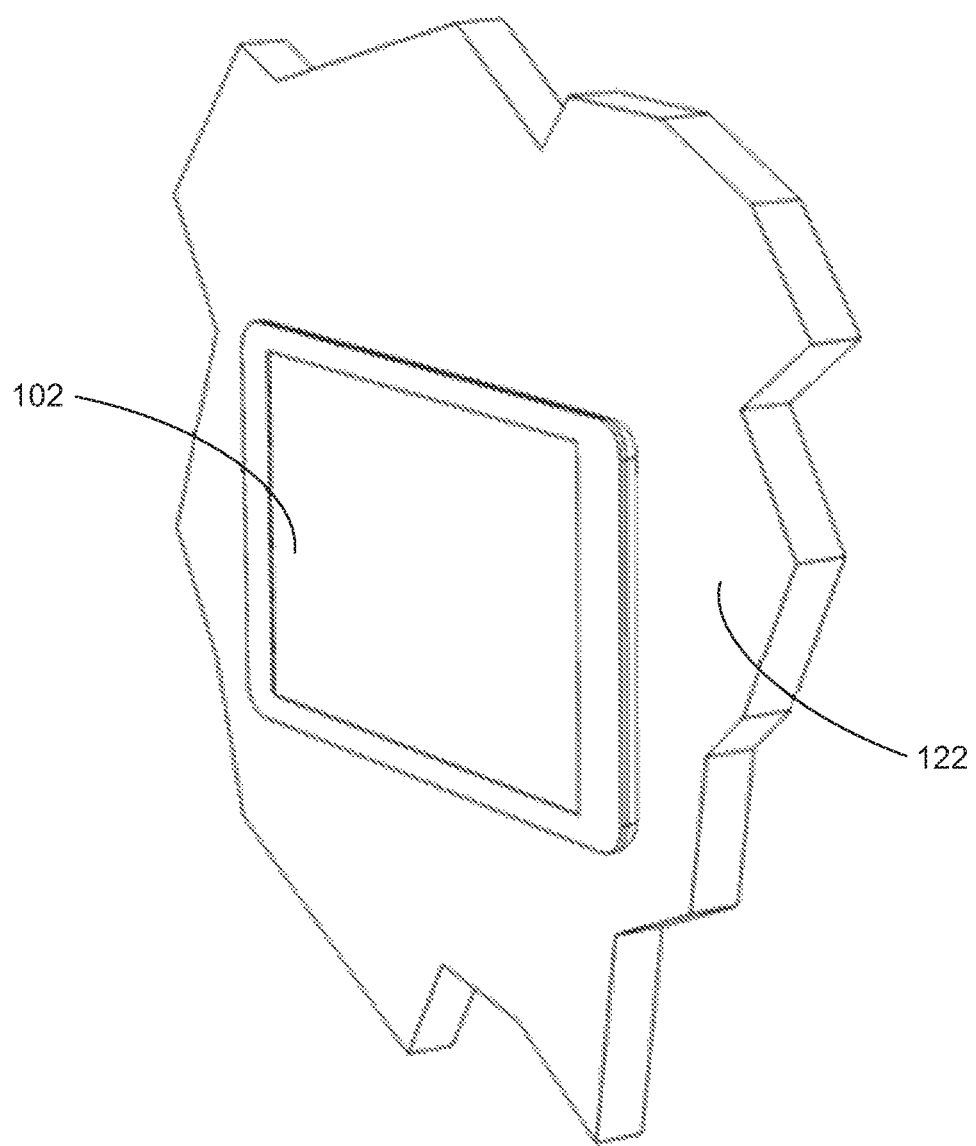
FIG. 4 illustrates an example touch-panel device affixed to a wall via the disclosed mounting system.

With respect to FIG. 4, an example view of how a touch-panel display device 102 may look when mounted according to the present disclosure. The touch-panel display device 102 may be positioned substantially close to the mounting surface 122 such as a wall, which may provide a floating visual effect. In addition to the floating visual effect achieved by the mount assembly, the touch-panel device 102 may appear to be directly attached to the mounting surface in a clean manner which may be an enhancement to the overall aesthetic of a room in which the mount assembly is used.

Figure 5:
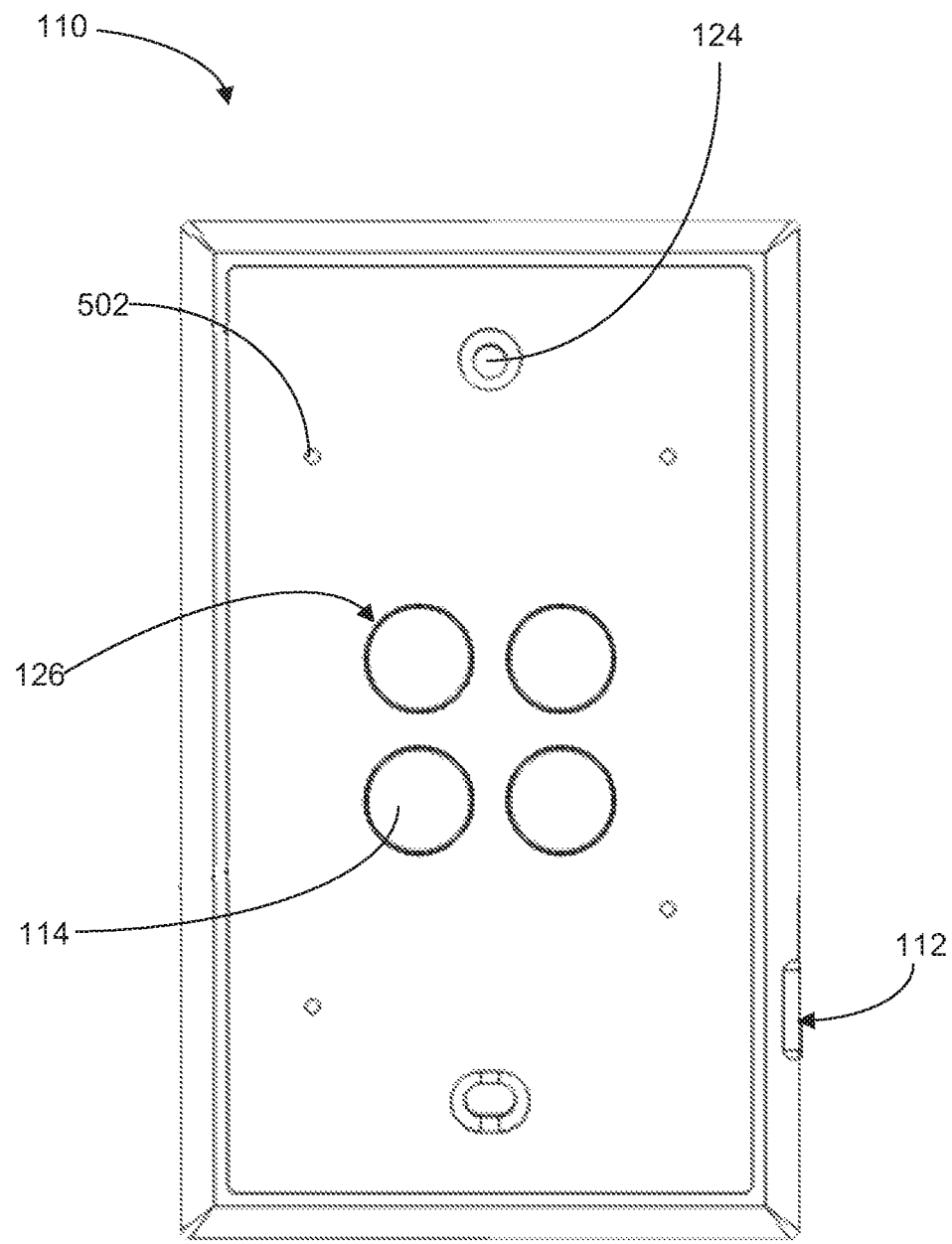
FIG. 5 shows a partially constructed mounting system in a straight on view.

In FIG. 5, a straight on view of the front face of the mount assembly's mounting plate 110 is provided. In this view, the gripping surface 106 is removed in order to more clearly illustrate the components of the mounting plate 110 disposed within an internal area such as the magnet voids 126 and screw holes 124, and rearward fastening holes 502. In some examples, the rearward fastening holes 502 may not be visible from a front facing view.

The mounting plate 110 of the mount assembly 100 may serve to organize all of the components in the assembly such as the magnets 114. The mounting plate 110 may provide a clean appearance and may further blend cosmetically with the existing features of a room in a home or office.

In this figure, the external connector 112 is illustrated. In at least one embodiment, the external connector 112 may comprise a micro USB or other such connector that may facilitate power and/or data transfer. The external connector 112 is shown in FIG. 5 located on a lower side of the mounting plate 110 in order to provide easy access to the port. It will be appreciated however, that the external connector 112 may be located on any exterior edge of the mounting plate 110. In this regard, the external connector 112, in some examples, may be located anywhere on the mounting plate 110. The external connector 112 may additionally serve to allow a user the ability to change the type of cable used with the mount assembly 100 such that any number of touch-panel display devices may be used with the mount.

The screw holes 124 may provide a passage through which screws may be inserted in order to secure the mount assembly to a mounting surface in one embodiment. It will be appreciated that screw holes 124 may be provided in embodiments wherein the mount assembly may be affixed to a mounting surface without the use of screws such that the mount assembly may be moved and repositioned without limiting its applicability. For example, if a user initially secures the mount assembly to a mirror via tape or other suitable adhesive, the mounting plate 110 may still comprise screw holes 124 such that the mounting plate 110 and thus, the mount assembly 100 may be affixed to a wall via traditional fastening methods such as screws and anchors.

In some embodiments, rearward fastening holes 502 may be provided within an internal region of the mounting plate 110 such that a magnet buffer may be affixed to the rear face of the mounting plate 110. In this way, a strengthened magnetic field exhibited by the internal magnets 114 of the mount assembly may be achieved.

Figure 6:
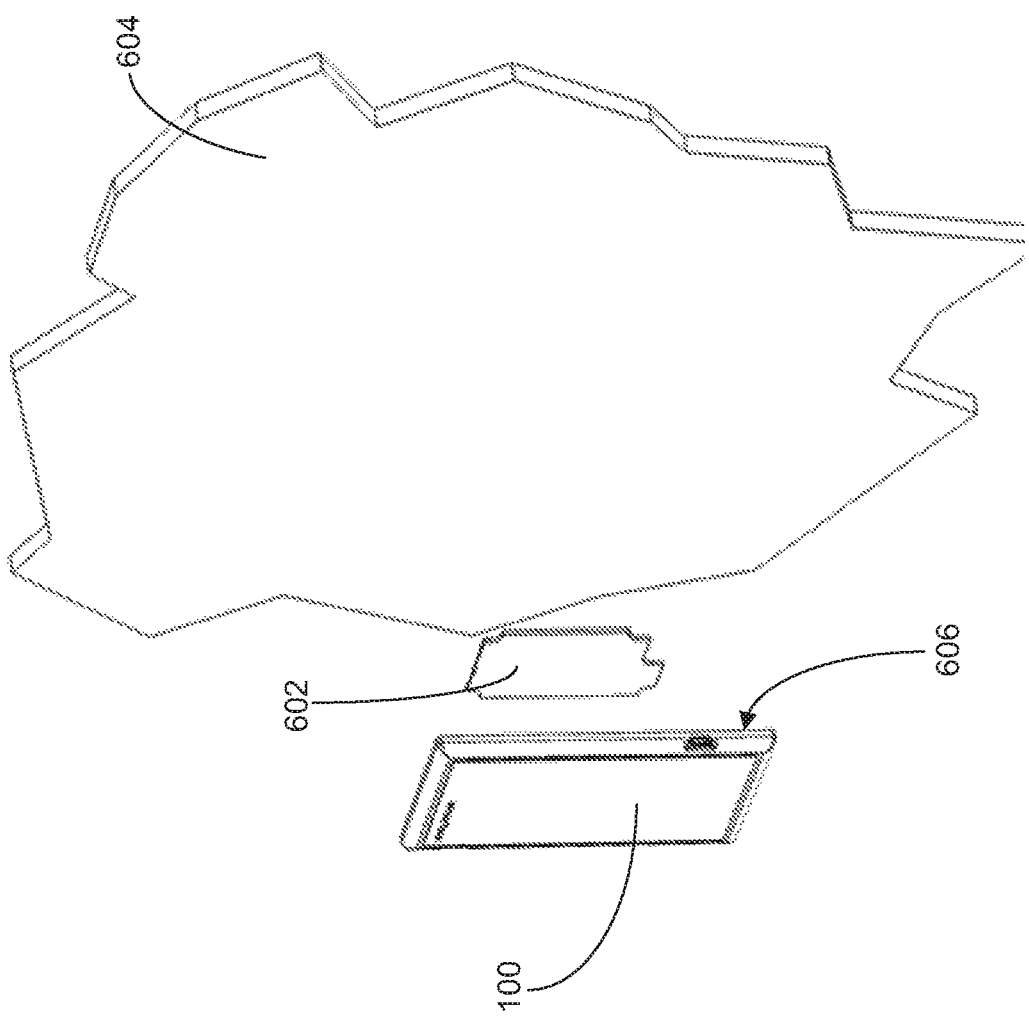
FIG. 6 shows a mounting system affixed to a mounting surface via an alternative mounting method.

Turning now to FIG. 6, this figure provides an illustration of a case in which the mount assembly 100 is to be mounted onto a difficult to drill mounting surface 604. Mounting surfaces that are difficult to drill or surfaces in which a user may not want to drill into the surface may be configured to hold the mount assembly 100 via the use of a durable adhesive such as double-sided tape in one example embodiment.

In FIG. 6, the combined mount assembly 100 is illustrated with a double-sided adhesive tape 602 sandwiched between a rear face of the assembly 100 and the difficult to drill mounting surface 604. In this way, the mount assembly 100 may be releasably coupled to the mounting surface 604 such that at least the outer periphery of the mount assembly's rear exterior face 606 is in direct face-sharing contact with the outermost surface of the mounting surface 604 wherein a double-sided adhesive tape 602 is disposed therebetween.

In this way, the mounting assembly may be affixed to any number of mounting surfaces such that the mount assembly 100 may be removed and/or repositioned and the utility and/or applicability of the device may not be hindered.

Figure 7:
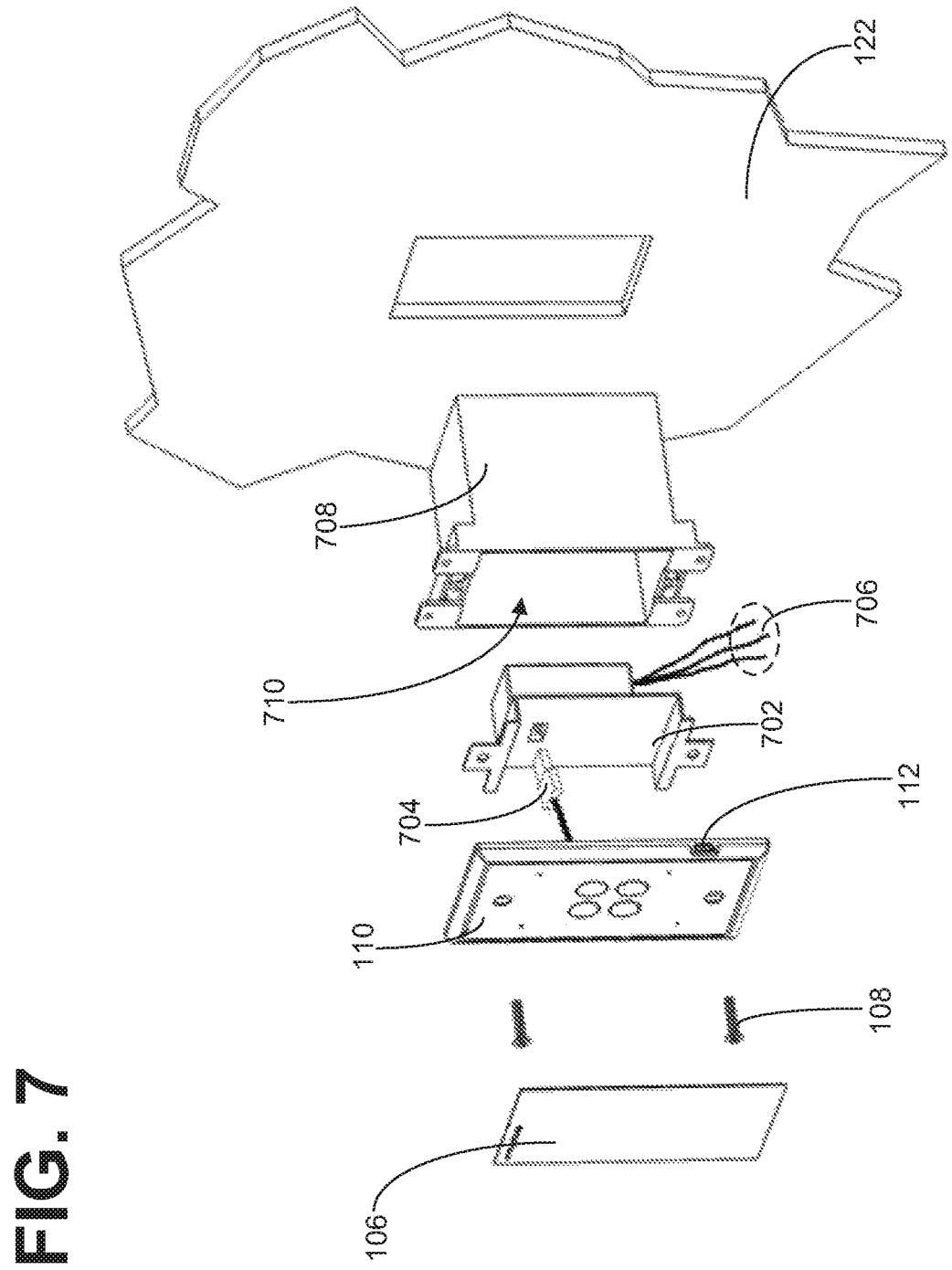
FIG. 7 illustrates a mounting configuration using an in-wall power supply.

An example embodiment of the on-wall docking station 100 wherein the station assembly 100 is powered via a home or office's existing electrical wiring is provided in FIG. 7. It will be appreciated that the disclosed on-wall docking station 100 may be used with or without supplying power to the assembly. For example, the subject mount assembly 100 may be used solely to dock and/or display a touch-panel display device, or alternatively, may be used to charge the touch-panel display device while the device is coupled to the mount assembly 100.

The illustration provided in FIG. 7 illustrates how the assembly 100 may be configured to supply power to a touch-panel display device using an existing wall power supply of a home or office. In this example embodiment, the mounting plate 110 is shown directly coupled to an in-wall power supply 702 via a connection wire 704. The in-wall power supply 702 may be releasably coupled to an existing electrical box 708 and may further be configured to provide power to the mounting plate 110 via a series of wires 706 that connect to the existing electrical wiring of a home or office.

In one embodiment, the in-wall power supply may be configured to receive a local high-voltage power current and convert the voltage to a voltage suitable for charging the touch-panel display device. In this way, the existing power of a home or office may be utilized while not subjecting the touch-panel display device to unnecessarily high voltages.

In this figure, a gripping surface 106 is shown. The gripping surface may comprise and define a front exterior face of the mount assembly 100 and may conceal mounting screws 108 that may couple the mounting plate 110 to an in-wall power supply which may further be coupled to an existing electrical box 708. The electrical box 708 may be coupled to the mounting surface 122 using screws and/or anchors in one example.

In one embodiment, the in-wall power supply 702 may be coupled to a rearward face of the mounting plate 110 such that the front face of the power supply 702 and the rear face of the mounting plate 110 are in direct face sharing contact with one another. When coupled together via mounting screws 108, the mount assembly may then be placed into the cavity 710 of an existing electrical box 708.

Further, the external connector 112 may be configured to provide power to any number of devices via adjustment of the connection port itself. For example, the external connector may comprise a micro USB, mini USB, or other suitable power and/or data transfer medium.

In one example, the mounting plate 110 may be configured to provide wireless power via the use of induction charging methods or techniques. In this embodiment, an external connector 112 may not be necessary and the power to the mounting plate via the in-wall power supply 702 and the wires 706 connecting the power supply to the local high voltage power of a home or office may be transferred via induction. For example, in an embodiment comprising wireless charging capabilities, there may exist an electrical connection between the in wall power supply 702 and existing electrical wiring of a home or office. In such a case, the inductive charging method may be used in lieu of the external connector 112.

In a further example embodiment, the mounting plate 110 may be configured to supply power to a plurality of touch-panel devices via both traditional wired power connection mediums and wireless charging methods. In this way, the mount assembly 100 may be configured to mount and/or charge a multitude of various touch-panel display devices without requiring unnecessary modifications to the mount assembly 100 or the mounting surface 122.

Figure 8:
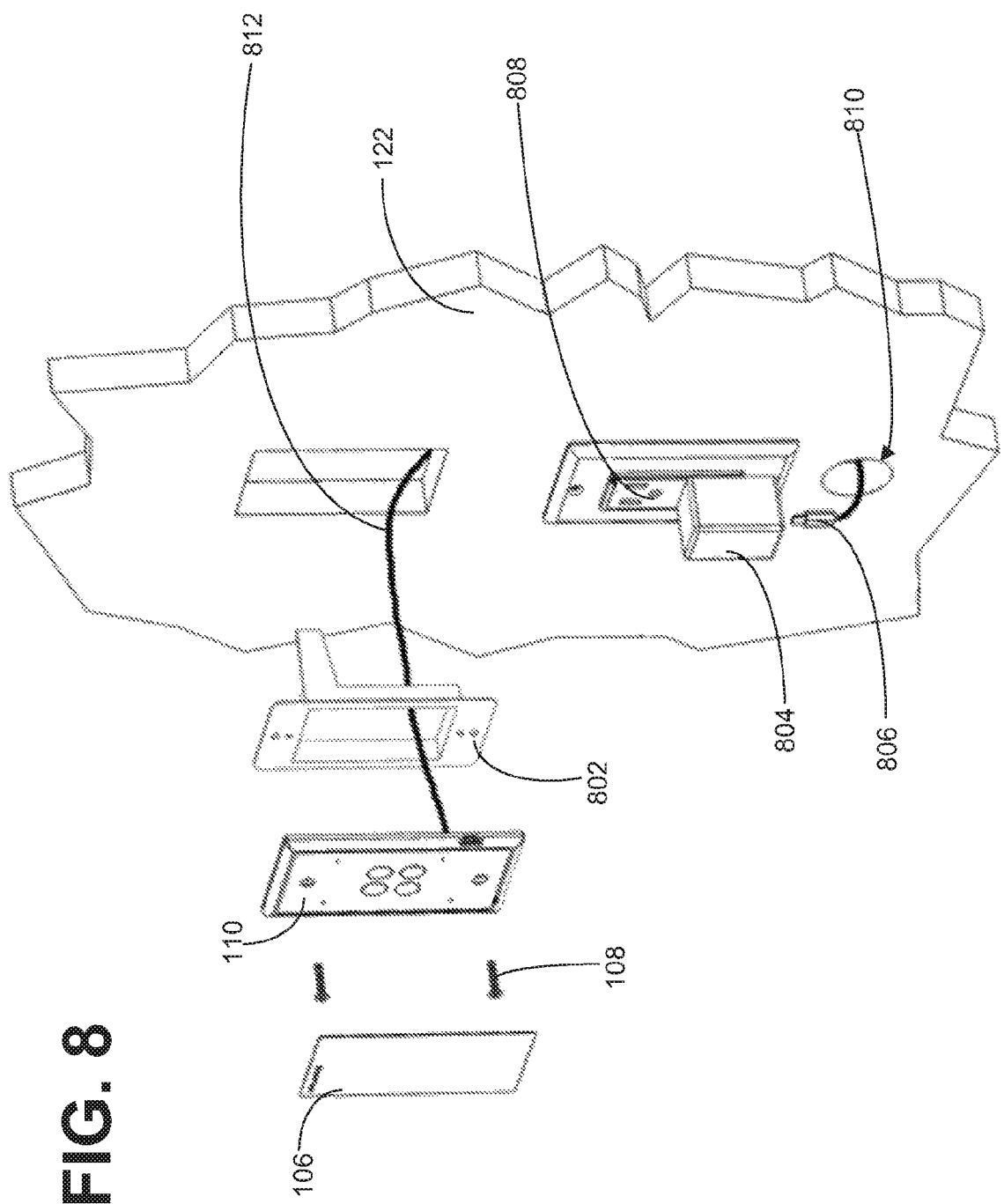
FIG. 8 illustrates a mounting configuration using a standard power outlet.

An additional example embodiment is illustrated in FIG. 8. In this embodiment, providing power to the mounting plate 110 and thusly the mount assembly 100 may not require substantial knowledge of high voltage electrical components. In this embodiment, a power supply 804 may be provided to plug into a regular existing power outlet 808. As an example, the power supply 804 may be configured to convert the power received from the wall socket 808 into the correct voltage required by the mounting plate 110 to safely charge and/or power a touch-panel display.

In one embodiment, the power supply 804 may comprise a Power over Ethernet (POE) device. In such an embodiment, the POE device may allow for running power over a relatively long cable such as a Cat5 in order to power the device from another part of the home such as rack mounted equipment for example. When power may be supplied via a POE device, the power supply 804 may be plugged into an existing wall outlet in another room for example. Alternatively, the cable 806 may be plugged into a POE network switch in order to supply power remotely.

In FIG. 8 the example embodiment of a docking station 100 features a cable 812 running from a rearward face of the mounting plate 110, traversing through an electrical box 802, further traversing through a mounting surface 122, and extending downward relative to the mount assembly's position. The cable 812 may then return to an exterior surface of the mounting surface 122 via a small hole referred to herein as a low voltage ring 810.

The low voltage ring 810 may allow the cable 812 of the mounting plate 110 to be electrically coupled to a power supply 804 in a manner such that the cable may be partially visible or such that the visibility of the cable 812 may be reduced. In this way, the aesthetic appearance of the mount assembly 100 may be maintained even in instances wherein the power of the mount assembly 100 may be supplied via a standard wall outlet 808.

In one embodiment, the cable 812 may be configured to provide wireless charging capabilities via a wireless charging source such as QI or PMA. In such cases, the wireless charging source may be placed directly behind the mounting plate 110 between a rear face of the mounting plate 110 and a front face of the mounting surface 122 and may transmit power to the touch-panel display device wirelessly.

Figure 9A:
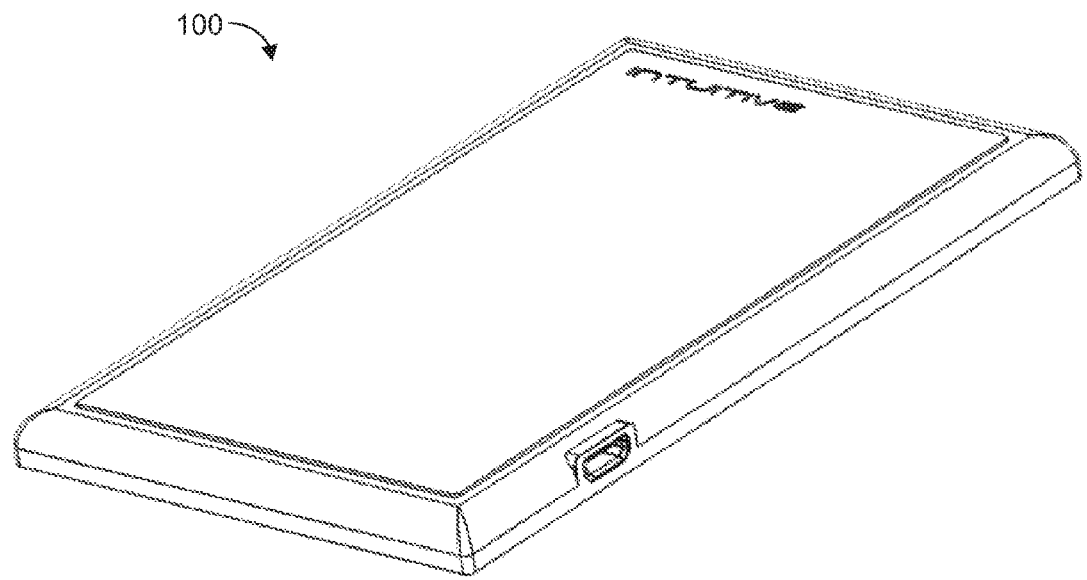
FIG. 9A is a front right isometric view of the touch-panel mounting system.
Figure 9B:
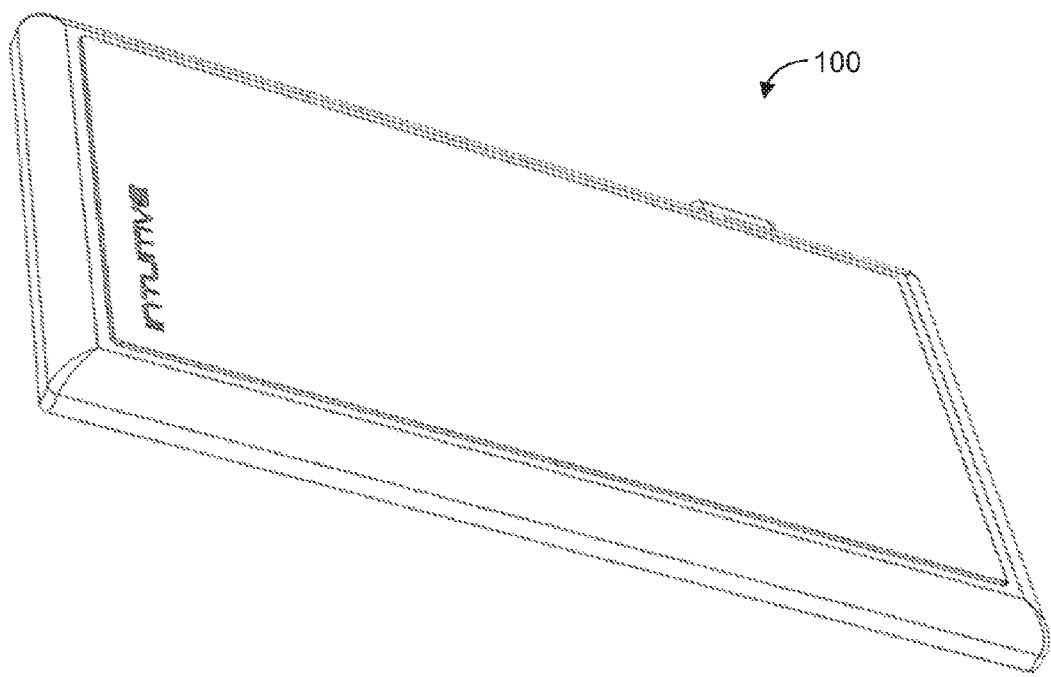
FIG. 9B is a left front isometric view of the touch-panel mounting system.
Figure 10:
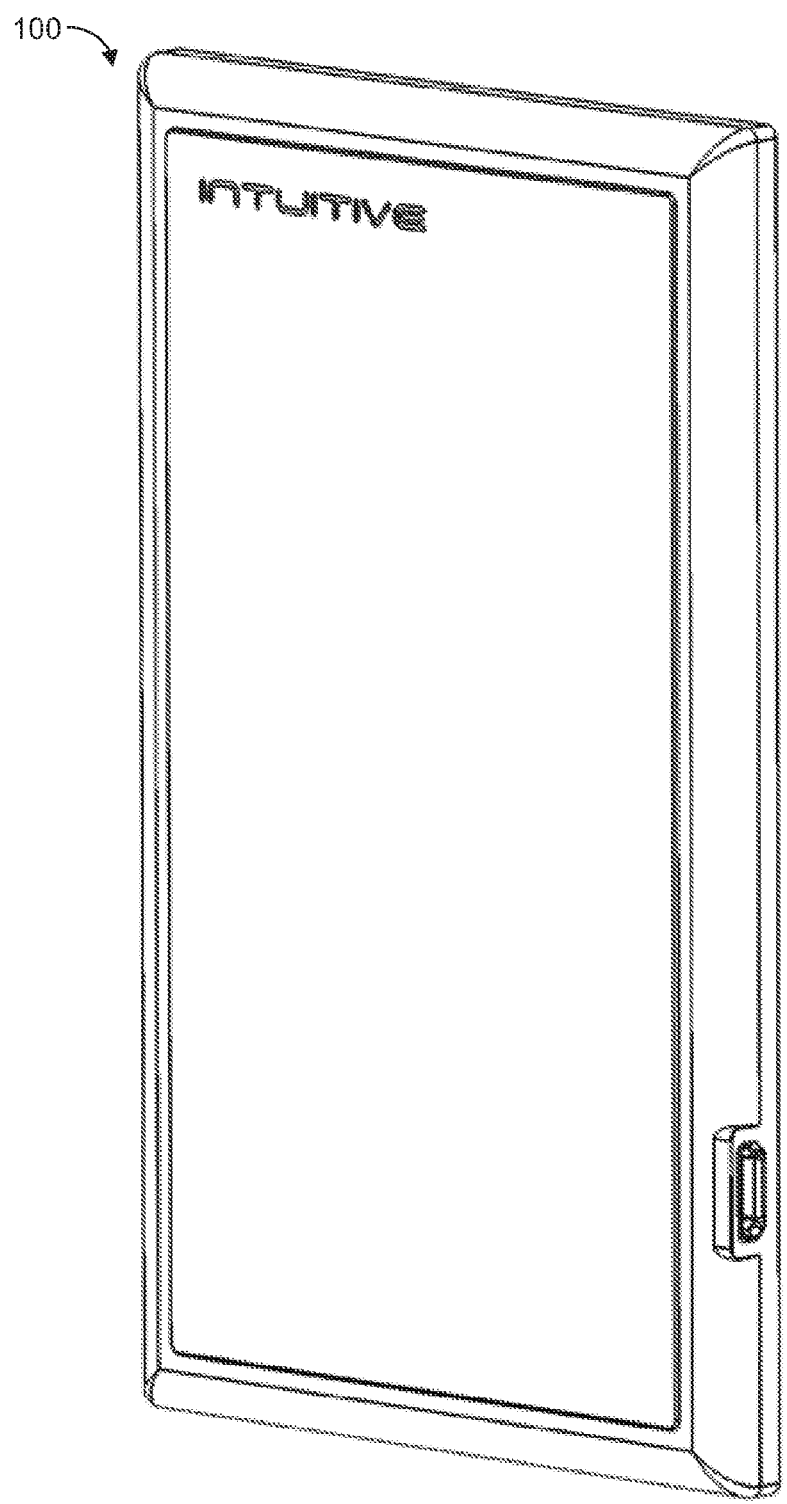
FIG. 10 is a right front profile view of the touch-panel mounting system.

FIG. 9A, FIG. 9B, and FIG. 10 are provided herein to illustrate various perspective views of one embodiment of the disclosed on-wall docking station/mount for touch-panel devices.

With respect to FIG. 9A, this figure provides a front right isometric view of an example embodiment of the disclosed touch-panel mounting system 100. The example embodiment may comprise a gripping surface, mounting screws, a mounting plate, an external connector, a plurality of magnets, a near field communication device, a magnet buffer, and rearward fastening screws. The embodiment provided may be substantially thin so as to provide a touch-panel device mount that may not protrude unnecessarily outward from the mounting surface.

In one example embodiment, the mount assembly may be substantially thin, such as ¼ of an Inch or Less Such that the Touch-Panel Display Device May be Mounted to any Surface and the protrusion of the mount may not hinder typical operation within the mounting area. For example, when mounted on a wall in a kitchen setting, a touch-panel display device may be positioned such that typical movement within the counter space may not be negatively impacted.

FIG. 9B shows a left front isometric view of an example embodiment of the disclosed touch-panel mounting system 100. In this view, the sleek nature of the mount assembly 100 may be visible. The example embodiment may comprise a gripping surface, mounting screws, a mounting plate, an external connector, a plurality of magnets, a near field communication device, a magnet buffer, and rearward fastening screws. The embodiment provided may be substantially thin so as to provide a touch-panel device mount that may not protrude unnecessarily outward from the mounting surface.

FIG. 10 illustrates a right front profile view of the example embodiment provided in FIGS. 9A and 9B. The example embodiment may comprise a gripping surface, mounting screws, a mounting plate, an external connector, a plurality of magnets, a near field communication device, a magnet buffer, and rearward fastening screws. The embodiment provided may be substantially thin so as to provide a touch-panel device mount that may not protrude unnecessarily outward from the mounting surface.

Although the figures may illustrate an external connection 112 as the principal method of supplying power to the touch-panel display device to be mounted, it will be appreciated that the mount assembly may be configured to supply power to the touch-panel display device via wireless charging methods. Such wireless charging methods may be inclusive of, but not limited to, inductive power standard methods (QI), power matters alliance (PMA) methods, or any other suitable wireless charging method.

As one example embodiment, an on-wall docking station coupled to a mounting surface for selectively retaining a touch-panel device may comprise a mount assembly including a mounting plate with one or more magnets, a gripping surface on the external front face of the mounting plate, a near field communication device disposed within an interior region of the mounting plate, and a magnet buffer in contact with the one or more magnets. The buffer may serve to increase the magnetic field strength of the one or more magnets of the mounting plate. The docking station may further include a mount assembly comprising a substantially thin profile in line with a plane common to the mounting surface. Further, the docking station may include a metallic pad magnetically retained on the mount assembly in a freely rotatable manner such that the pad is parallel to the mounting surface. In some embodiments, the metallic pad may be releasably coupled to the touch-panel device. In one embodiment, the metal pad may comprise a substantially thin profile of 0.25 inches or less. In some examples, the profile of the metal pad may be 0.5 inches or less.

An additional embodiment may comprise one or more magnets oriented to exhibit an alternating polarity and combined magnetic field. The combined magnetic field and alternating polarity may allow for a first, second, and third position of the metal pad. A first position may refer to a vertical orientation along and parallel to the plane common to the mounting surface wherein the metal pad comprises 0 degrees of rotation about an axis perpendicular to the mounting surface plane. A second position may refer to a horizontal orientation parallel to the plane common to the mounting surface comprising 90 degrees of rotation about the axis perpendicular to the mounting surface. A third position may refer to any position between the first and second positions parallel to the mounting surface rotated about the axis perpendicular to the mounting surface. In one embodiment, the mounting plate may be a durable plastic, metal, or magnetic material. Some embodiments may include a gripping surface comprising a rubber or gripping foam. A further embodiment may additionally or alternatively include wherein mounting screws fixedly attach the mount assembly to a mounting surface. Alternatively, the embodiment may include a double-sided adhesive tape that fixedly attaches the mount assembly to a mounting surface.

In a further example embodiment, a mount assembly for a docking station may comprise a mounting plate including an external connection port configured to accept a wired input, a gripping surface disposed on the external front face of the mounting plate, one or more magnets disposed within the mounting plate, and a magnet buffer in contact with the one or more magnets. The magnet buffer may serve to increase the magnetic field strength of the one or more magnets. In one embodiment, the mounting plate may be a durable plastic, metal, or magnetic material. A further embodiment may additionally or alternatively include wherein mounting screws fixedly attach the mount assembly to a mounting surface. Alternatively, the embodiment may include a double-sided adhesive tape that fixedly attaches the mount assembly to a mounting surface. Some embodiments may further comprise a metallic pad releasably coupled to a touch-panel device. In embodiments comprising a metallic pad, the metallic pad may be releasably coupled to a touch-panel device with a double-sided adhesive tape.

As another example, a docking station for a touch-panel device may comprise a mounting plate, one or more magnets disposed within the mounting plate, and a metal pad magnetically retained by the mounting plate. The metal pad may be selectively coupled to the mounting plate in a freely rotatable manner along a plane common to the mounting surface. In one embodiment, the metal pad may comprise a substantially thin profile of 0.25 inches or less. An additional embodiment may comprise one or more magnets oriented to exhibit an alternating polarity and combined magnetic field. The combined magnetic field and alternating polarity may allow for a first, second, and third position of the metal pad. A first position may refer to a vertical orientation along and parallel to the plane common to the mounting surface wherein the metal pad comprises 0 degrees of rotation about an axis perpendicular to the mounting surface plane. A second position may refer to a horizontal orientation parallel to the plane common to the mounting surface comprising 90 degrees of rotation about the axis perpendicular to the mounting surface. A third position may refer to any position between the first and second positions parallel to the mounting surface rotated about the axis perpendicular to the mounting surface.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from one another with only a space therebetween and no other components may be referred to as such, in at least one example. As yet another example, elements shown above or below one another, at opposite sides relative to one another, or to the left or right of one another may be referred to as such, relative to one another.

Further, as shown in the figures, a topmost element or point of the element may be referred to as a "top" of the component and a bottommost element or point of the element may be referred to as a "bottom" of the component, in at least one example.

As used herein, top/bottom, upper/lower, above/below, may be relative to a vertical axis of the figures and may be used to describe positioning of elements of the figures relative to one another. As such, elements shown above other elements are positioned vertically above the other elements in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such in one example.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub combinations of the various features, functions, acts, and/or properties disclosed herein, as well as any and all equivalents thereof.

The following claims particularly point out certain combinations and sub combinations of the present subject matter regarded as novel and nonobvious. These claims may refer to "an" element or "a first" element or the equivalent thereof. Such claims should be understood to include incorporation of one or more such elements, neither requiring nor excluding two or more such elements. Other combinations and sub combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An on-wall docking station coupled to a mounting surface for selectively retaining a touch-panel device comprising:
   a mount assembly including a mounting plate with one or more magnets, a gripping surface on the external front face of the mounting plate, a near field communication device disposed within an interior region of the mounting plate, and a magnet buffer in contact with the one or more magnets, wherein the mount assembly comprises a substantially thin profile in line with a plane common to the mounting surface; and
   a metallic pad magnetically retained on the mount assembly in a freely rotatable manner parallel to the mounting surface.

2. The on-wall docking station of claim 1, wherein the metallic pad comprises a substantially thin profile of about 0.25 inches or less.

3. The on-wall docking station of claim 1, wherein the one or more magnets of the mounting plate are oriented exhibiting an alternating polarity and combined magnetic field that allows for a first, second, and third position of the metallic pad on the mount assembly.

4. The on-wall docking station of claim 1, further comprising a first, second, and third position for the metallic pad, wherein a first position is a vertical orientation parallel to the plane common to the mounting surface comprising 0 degrees of rotation about an axis perpendicular to the mounting surface, a second position is a horizontal orientation parallel to the plane common to the mounting surface comprising 90 degrees of rotation about the axis perpendicular to the mounting surface, and a third position is any position between the first and second positions parallel to the mounting surface plane and rotated about an axis perpendicular to the mounting surface.

5. The on-wall docking station of claim 1, wherein the mounting plate is a durable plastic, metal, or magnetic material.

6. The on-wall docking station of claim 1, wherein the gripping surface is a rubber or gripping foam.

7. The on-wall docking station of claim 1, wherein the metallic pad is releasably coupled to the touch-panel device.

8. The on-wall docking station of claim 1, wherein mounting screws fixedly attach the mount assembly to the mounting surface.

9. The on-wall docking station of claim 1, wherein a double-sided adhesive tape fixedly attaches the mount assembly to the mounting surface.

10. The on-wall docking station of claim 1, wherein the magnet buffer increases the magnetic field strength of the one or more magnets of the mounting plate.

11. A mount assembly for a docking station comprising:
    a mounting plate including an external connection port configured to accept a wired input;
    a gripping surface disposed on the external front face of the mounting plate;
    one or more magnets disposed within the mounting plate; and
    a magnet buffer in contact with the one or more magnets, wherein the magnet buffer increases the magnetic field strength of the one or more magnets.

12. The mount assembly of claim 11, wherein the mounting plate is a durable plastic, metal, or magnetic material.

13. The mount assembly of claim 11, wherein mounting screws fixedly attach the mount assembly to a mounting surface.

14. The mount assembly of claim 11, wherein a double-sided adhesive tape fixedly attaches the mount assembly to a mounting surface.

15. The mount assembly of claim 11, further comprising a metallic pad releasably coupled to a touch-panel device.

16. The mount assembly of claim 15, wherein the metallic pad is releasably coupled to a touch-panel device with a double-sided adhesive tape.

17. A docking station for a touch-panel device comprising:
    a mounting plate;
    one or more magnets disposed within the mounting plate; and
    a metal pad magnetically retained by the mounting plate; wherein the metal pad is selectively coupled to the mounting plate in a freely rotatable manner.

18. The docking station of claim 17, wherein the metal pad comprises a substantially thin profile of about 0.25 inches or less.

19. The docking station of claim 17, wherein the one or more magnets are oriented exhibiting an alternating polarity and combined magnetic field that allows for a first, second, and third position orientation of the metal pad.

20. The docking station of claim 17, further comprising a first, second, and third position for the metallic pad, wherein a first position is a vertical orientation parallel to the plane common to the mounting surface comprising 0 degrees of rotation about an axis perpendicular to the mounting surface, a second position is a horizontal orientation parallel to the plane common to the mounting surface comprising 90 degrees of rotation about the axis perpendicular to the mounting surface, and a third position is any position between the first and second positions parallel to the mounting surface plane and rotated about an axis perpendicular to the mounting surface.

* * * * *